Nov. 26, 1957 — M. K. BABAIAN — 2,814,187
FLEXIBLE COUPLING

Filed May 23, 1956 — 2 Sheets-Sheet 1

INVENTOR.
Mesrop K. Babaian
BY
Roy Griffith Jones.

Nov. 26, 1957     M. K. BABAIAN     2,814,187
FLEXIBLE COUPLING

Filed May 23, 1956     2 Sheets—Sheet 2

INVENTOR.
Mesrop K. Babaian
BY
Roy Griffith Jones

United States Patent Office

2,814,187
Patented Nov. 26, 1957

---

2,814,187

FLEXIBLE COUPLING

Mesrop K. Babaian, East Orange, N. J.

Application May 23, 1956, Serial No. 586,881

1 Claim. (Cl. 64—15)

This invention relates to a new type of flexible coupling, having the advantages hereinafter stated.

One of the deficiencies of previous flexible couplings is the requirement of a large variety of sizes for shafts transmitting substantially different amounts of power. This requirement not only makes production more expensive, but also requires the user to buy a large number of couplings of different sizes, and at times further necessitates changing couplings, all of which is rendered unnecessary by my radically new coupling. In other words, the coupling of this invention is adaptable to shafts transmitting widely different horsepowers, a given size being suitable for shafts transmitting a wide range of power; the only requirement for adaptation being a readily made change in the number and/or compressive resistance of springs.

The new coupling is also rugged and simple in construction, and is efficient in operation not only when shafts connected thereby are in alignment, but also when they are in parallel or angular misalignment.

The drawings show one embodiment of the invention, as required, but various modifications may be made without departing from the inventive concept.

Figure 1:
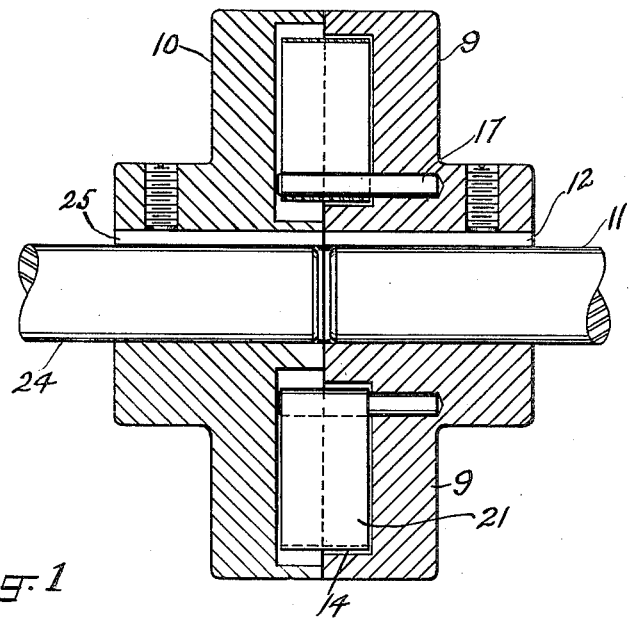
Fig. 1 is a central vertical section of the coupling, shown mounted on a driving and a driven shaft.
Figure 2:
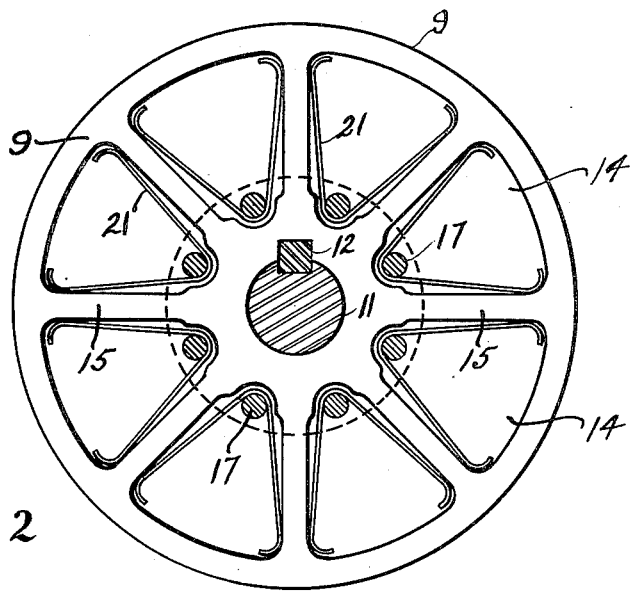
Fig. 2 is a plan view of the inner side of one of the two main parts of the coupling, with springs therein.

Referring to the drawings for a more detailed description thereof, the numerals 9 and 10 indicate the two principal parts of the coupling, the same being peripherally circular and, in general, similar in form. They are in opposed and contacting relation to each other, with one of the parts mounted on and releasably secured to the driving shaft and the other mounted on and secured to the driven shaft, it being inmaterial as to which part is attached to a given shaft. Part 9, shown in Figs. 1 and 2, is centrally apertured, to allow it to be mounted on driving shaft 11, and is secured thereto by key 12. The inner face of this part is hollowed out to provide a series of spaced, and generally triangular or sectorial, recesses 14, extending thru 360 degrees and lying between the rim and the hub and spaced apart by radial walls 15. The recesses have their apexes adjacent the hub, and their bases at the rim, the apexes and bases being arcuate.

Figures 3, 4:
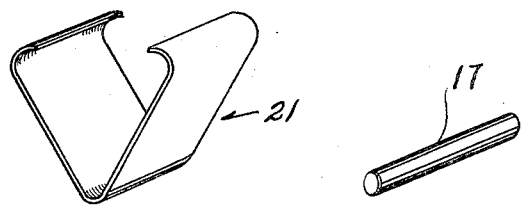
Fig. 3 is a perspective view of the type of spring which may be used.
Fig. 4 is a view of a pivot pin, one of which is used for each spring.
Figure 5:
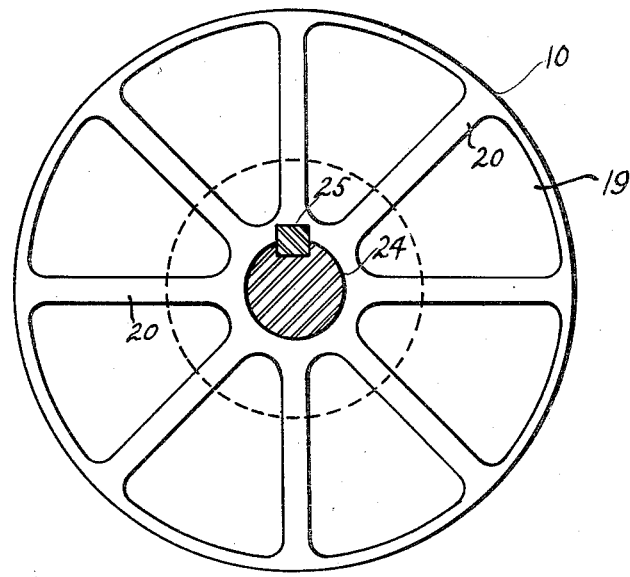
Fig. 5 is a plan view of the inner side of the other main part of the coupling.

Close to, but spaced from, the apexes are pins 17, one for each of the recesses 14; these pins are anchored in part 9 and extend transversely beyond its inner face and into the coacting part 10, the latter also having its inner face hollowed out, as shown in Figs. 1 and 5, to provide triangular or sectorial recesses 19, equal in number to the recesses 14 in the part 9, and aligned with the same, radial walls 20 separating adjacent recesses 19. It will be seen from Fig. 1 that the recesses 19 are somewhat longer than the recesses 14, this to assure that the springs presently to be mentioned enter readily the recesses 19 when parts 9 and 10 are put together. The springs just referred to are of the form shown in Fig. 3 and are designated by numeral 21. Springs 21 are, in general, V-shaped, to conform to the recesses 14 and 19, but are shown as preferably inturned at their ends. As clearly shown in Fig. 2, these springs, made from resilient strips of metal, are placed, at their apexes, around the mentioned pins 17, and contact, at their outer ends, the mentioned radial separating walls 15. With parts 9 and 10 face to face and in contact, springs 21 extend from the former into the latter, and are held in place by the pins 21, which act as pivots, and by the separating walls of both of said parts, it being understood that the part 10, as shown, is secured to the driven shaft 24 by key 25, the two parts 9 and 10 thereby being connected for torque action. Obviously, when the driving shaft turns, the driven shaft is turned by the pressure of springs 21 against the separating walls 20 of part 10, the springs being compressed under a load, and to the extent of the load.

One of the valuable features of my invention is that the number and/or compressive strength of the springs may be changed to suit the load. For example, for comparatively light loads, fewer than the eight springs shown may be used. And for heavy loads it is only necessary to either increase the number of springs to the full number or to put in heavier springs, this being readily done as the springs are not attached to anything. Also, some of the springs might be mounted in each of the parts 9 and 10.

What is claimed is:

A flexible coupling comprising two principal, opposed, and hollow parts, one to be secured to a driving shaft and the other to a driven shaft, a plurality of radial walls in each of said parts, providing a plurality of similar sectorial compartments therein, a plurality of retaining pivot pins in at least one of said parts, and a plurality of substantially V-shaped compressible springs around said pins and loosely but adequately held in operating position in at least some of said compartments without attachments, the apexes of said V-shaped springs being adjacent said pins, the springs held in the compartments of one of said parts extending into the other part to functionally connect said parts.

References Cited in the file of this patent

UNITED STATES PATENTS

| 870,106 | Jones | Nov. 5, 1907 |

FOREIGN PATENTS

| 51,216 | Norway | July 25, 1932 |
| 854,294 | Germany | Nov. 4, 1952 |